United States Patent
Ishibe (10) Patent No.: US 7,304,777 B2
(45) Date of Patent: Dec. 4, 2007

(54) OPTICAL SCANNING APPARATUS AND IMAGE FORMING APPARATUS USING THE SAME

(75) Inventor: Yoshihiro Ishibe, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 11/142,429

(22) Filed: Jun. 2, 2005

(65) Prior Publication Data

US 2005/0280696 A1   Dec. 22, 2005

(30) Foreign Application Priority Data

Jun. 2, 2004   (JP)   ............... 2004-164645

(51) Int. Cl.
  *G02B 26/08*   (2006.01)
(52) U.S. Cl. ............... 359/205; 359/216; 347/232; 347/259
(58) Field of Classification Search .............. None
  See application file for complete search history.

(56) References Cited

U.S. PATENT DOCUMENTS

| | | | |
|---|---|---|---|
| 4,962,982 A | 10/1990 | Takanashi | 350/6.8 |
| 5,539,441 A | 7/1996 | Appel et al. | 347/134 |
| 5,793,515 A | 8/1998 | Sekikawa | 359/216 |
| 5,812,181 A | 9/1998 | Ishibe | 347/258 |
| 5,895,720 A | 4/1999 | Ishibe | 359/196 |
| 5,995,131 A | 11/1999 | Fujibayashi et al. | 347/258 |
| 6,067,106 A | 5/2000 | Ishibe | 347/258 |
| 6,133,935 A | 10/2000 | Fujibayashi et al. | 347/258 |
| 6,256,132 B1 | 7/2001 | Ishibe | 359/204 |
| 6,317,244 B1 | 11/2001 | Ishibe | 359/204 |
| 6,362,470 B1 | 3/2002 | Yoshida et al. | 250/235 |
| 6,731,418 B2 | 5/2004 | Ishibe | 359/204 |
| 6,914,620 B2 | 7/2005 | Yoshida et al. | 347/235 |
| 6,954,295 B2 | 10/2005 | Ishibe | 359/196 |

(Continued)

FOREIGN PATENT DOCUMENTS

EP   1075137   2/2001

(Continued)

OTHER PUBLICATIONS

H. Horikawa, et al., "Relationship Between Fluctuation in Mirror Radius (Within One Polygon) and the Jitter", SPIE Proceedings of Beam Deflection and Scanning Technologies, vol. 1454 (1991), pp. 46-59.

*Primary Examiner*—James Phan
(74) *Attorney, Agent, or Firm*—Fitzpatrick, Cella, Harper & Scinto (57) ABSTRACT

An overfilled optical scanning apparatus has an incidence optical system for converging a light beam onto a deflection surface of a light deflector which has a plurality of deflection surfaces, and an imaging optical system for imaging the deflected light beam onto a surface to be scanned. The imaging optical system satisfies a relationship among its focal length in a main scanning direction, the distance in the main scanning section from the rear principal plane position to an imaging point of the converged light beam, angles in the main scanning section formed by the optical axis of the imaging optical system and the principal ray of the light beams incident on the light deflector, the unevenness of distances in the main scanning section from the rotation center of the light deflector, and the number of pixels per inch in the main scanning direction on the surface to be scanned.

6 Claims, 8 Drawing Sheets

U.S. PATENT DOCUMENTS

| | | | |
|---|---|---|---|
| 6,989,855 B2 | 1/2006 | Ishibe | 347/244 |
| 2004/0189789 A1 | 9/2004 | Ishibe | 347/243 |
| 2005/0052525 A1 | 3/2005 | Ishibe | 347/235 |

FOREIGN PATENT DOCUMENTS

| | | |
|---|---|---|
| EP | 1339211 | 8/2003 |
| JP | 9-318874 | 12/1997 |
| JP | 2000-267030 | 9/2000 |

OPTICAL SCANNING APPARATUS AND IMAGE FORMING APPARATUS USING THE SAME

BACKGROUND OF THE INVENTION

1. Field of the Invention

This invention relates to an optical scanning apparatus and an image forming apparatus using the same, and particularly is suitable for an image forming apparatus such as, for example, a laser beam printer having an electrophotographic process, a digital copying machine or a multifunction printer adapted to record image information by the use of an overfilled optical scanning apparatus.

2. Related Background Art

A so-called underfilled optical scanning apparatus (hereinafter referred to as "UFS") in which the width of the deflection surfaces (reflecting deflection surfaces) of a rotating polygon mirror (hereinafter referred to as a polygon mirror) along the rotational direction thereof is made greater than the width of a light beam incident on the polygon mirror along a main scanning direction has heretofore been popular as an optical scanning apparatus in which a light beam is deflected in the main scanning direction by a polygon mirror as a light deflector and a surface to be scanned is scanned with the light beam.

On the other hand, in an image forming apparatus such as a laser beam printer or a digital copying machine, the higher speed of image recording and higher resolution are required. Particularly, with the spread of the coloring of image forming apparatuses in recent years, an image output of a high speed and high resolution is required more and more.

In the underfilled optical scanning apparatus as described above, in order to meet the requirement for a higher speed, a method of making the rotational speed of the polygon mirror higher, and a method of increasing the number of the surfaces of the polygon mirror are conceivable.

However, it is not easy to make the rotational speed of the polygon mirror higher because it poses various problems such as the heat generation of a motor for driving the polygon mirror, electric power consumption, windage loss occurring during the rotation of the polygon mirror, and noise. It is also not easy to increase the number of the surfaces of the polygon mirror while maintaining the width of the deflection surface along the rotational direction because it causes the bulkiness of the polygon mirror, and poses various problems similar to those noted above.

Also, higher resolution can be obtained by widening the width of the deflection surfaces of the polygon mirror along the rotational direction and making the F number (F No.) of an imaging optical system (scanning lens system) small. However, this likewise results in the bulkiness of the polygon mirror.

So, in order to prevent the size of the polygon mirror from enlarging and to increase the number of the deflection surfaces, a so-called overfilled optical scanning apparatus (hereinafter referred to also as "OFS") in which the width of the deflection surfaces of the polygon mirror along the rotational direction is set smaller than the width of the light beam in the main scanning direction has been put into practical use.

The above-described overfilled optical scanning apparatus, however, is an optical scanning apparatus suitable for high speed and high resolution, but because of the increased number of the deflection surfaces of the polygon mirror thereof, as compared with the underfilled optical scanning apparatus, the angle at which a deflection surface of the polygon mirror can scan becomes narrower, it is necessary to make the focal length of the imaging optical system (scanning lens system) long in order to scan the same scanning width. Therefore, the optical path length of the optical scanning apparatus becomes long, thus posing the problem that the entire apparatus becomes bulky.

Proposed has been an optical scanning apparatus which solves the above-noted problem (see Japanese Patent Application Laid-open No. 2000-267030).

In Japanese Patent Application Laid-open No. 2000-267030, the imaging optical system is constituted by two scanning lenses, and the inverse number of the combined focal length of the two scanning lenses in the deflection surfaces is made smaller than the inverse number of the system focal length of the optical scanning apparatus, thereby achieving a compact overfilled optical scanning apparatus in which the distance from the polygon mirror to the surface to be scanned is short.

Generally, making the inverse number of the combined focal length of the imaging optical system in the deflection surfaces smaller than the inverse number of the system focal length of the optical scanning apparatus can be achieved by converging a light beam incident on the imaging optical system in the main scanning direction.

In the above-mentioned Japanese Patent

Application Laid-open No. 2000-267030, however, the light beam incident on the imaging optical system is set to a convergent light beam (convergent beam) relatively strong in the main scanning direction, and the focal length of the imaging optical system in the main scanning direction is set to the negative. Therefore, when an unevenness amount δL exists in the distances from the rotation center of the polygon mirror to a plurality of deflection surfaces, there is the problem that great positional deviation occurs to an imaged spot on the surface to be scanned.

The above-mentioned positional deviation of the imaged spot on the surface to be scanned occurs without fail in principle if the light beam incident on the imaging optical system is a light beam convergent in a main scanning section, and cannot be avoided.

Also, it is a well known fact that the more a convergent light beam converges, the greater the above-mentioned positional deviation of the imaged spot on the surface to be scanned becomes. For example, in the underfilled optical scanning apparatus, Japanese Patent Application Laid-open No. H09-318874 discloses a technique that the optical scanning apparatus can be configured compact by making a light beam incident on the imaging optical system to be a light beam convergent in the main scanning direction, and the positional deviation of the imaged spot on the surface to be scanned can be mitigated by appropriately setting the degree of convergence of the above-mentioned convergent light beam where the unevenness amount δL exists in the distances from the rotation center of the polygon mirror to the plurality of deflection surfaces.

However, again in Japanese Patent Application Laid-open No. H09-318874, if the degree of convergence of the light beam incident on the imaging optical system is intensified, the positional deviation of the imaged spot on the surface to be scanned increases as previously described and therefore, the degree of convergence cannot be intensified and accordingly, there has been a limitation to the shortening of the optical path length of the optical scanning apparatus.

SUMMARY OF THE INVENTION

The present invention has as its object the provision of a high-performance and compact overfilled optical scanning apparatus and an image forming apparatus using the same.

According to one aspect of the invention, an optical scanning apparatus comprises light source unit, a light deflector having a plurality of deflection surfaces, an incidence optical system for causing a light beam emitted from the light source unit to be incident on the deflection surface of the light deflector in a main scanning section in a converged state with a light beam width wider than the width of the deflection surface, and an imaging optical system for imaging the light beam reflected by the light deflector on a surface to be scanned, wherein the following condition is satisfied:

$$\left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right] < \frac{25.4}{3N_M},$$

where f is the focal length of the imaging optical system in a main scanning direction, Sk is the distance from the rear side principal plane position of the imaging optical system in the main scanning section to an imaging point at which the converged light beam is imaged by the imaging optical system, α is an angle formed by the optical axis of the imaging optical system in the main scanning section and the principal ray of the light beam incident on the light deflector, β is an angle formed by the optical axis of the imaging optical system in the main scanning section and the principal ray of the light beam reflected at any angle by the light deflector, δL is the unevenness amount of the distances from the rotation center of the light deflector defined in the main scanning section to the plurality of deflection surfaces, and $N_M$ is the number of pixels per one inch in the main scanning direction on the surface to be scanned determined from the resolution of an image in the main scanning direction.

According to a further aspect of the invention, in the optical scanning apparatus, the condition that $$0.24 < 1 - \frac{Sk}{f} \leq 1.0$$

is satisfied.

According to another aspect of the invention, an optical scanning apparatus comprises light source unit, a light deflector having a plurality of deflection surfaces, an incidence optical system for causing a light beam emitted from the light source unit to be incident on the deflection surface of the light deflector in a converged state with a light beam width wider than the width of the deflection surface in a main scanning section, and an imaging optical system for imaging the light beam reflected and deflected by the light deflector on a surface to be scanned, wherein when projected into the main scanning section, the light beam emitted from the light source unit is incident on the deflection surface of the light deflector so as to be incident from the center of the deflecting angle of the light deflector and to form a predetermined angle with respect to a plane orthogonal to the rotary axis of the light deflector in a sub-scanning section.

According to a further aspect of the invention, in the optical scanning apparatus, the following condition is satisfied:

$$0.24 < 1 - \frac{Sk}{f} \leq 1.0,$$

where f is the focal length of the imaging optical system in the main scanning section, and Sk is the distance from the rear side principal plane of the imaging optical system to an imaging point at which the converged light beam is imaged by the imaging optical system.

According to another aspect of the invention, an image forming apparatus comprises an optical scanning apparatus set out in the foregoing, a photosensitive member disposed on the surface to be scanned, a developing device for developing an electrostatic latent image formed on the photosensitive member by scanning with a light beam by the optical scanning apparatus as a toner image, a transferring device for transferring the developed toner image to a material to be transferred, and a fixing device for fixing the transferred toner image on the material to be transferred.

According to another aspect of the invention, an image forming apparatus comprises an optical scanning apparatus set out in the foregoing, and a printer controller for converting code data inputted from an external device into an image signal and inputting the image signal to the optical scanning apparatus.

According to another aspect of the invention, a color image forming apparatus comprises a plurality of image bearing members disposed on the surface to be scanned of an optical scanning apparatus set out in the foregoing for forming images of different colors thereon.

According to a further aspect of the invention, the color image forming apparatus comprises a printer controller for converting color signals inputted from an external device into image data of different colors and inputting the image data to respective optical scanning apparatuses.

DESCRIPTION OF THE PREFERRED EMBODIMENTS

Some embodiments of the present invention will hereinafter be described with reference to the drawings.

Embodiment 1

Figure 1:
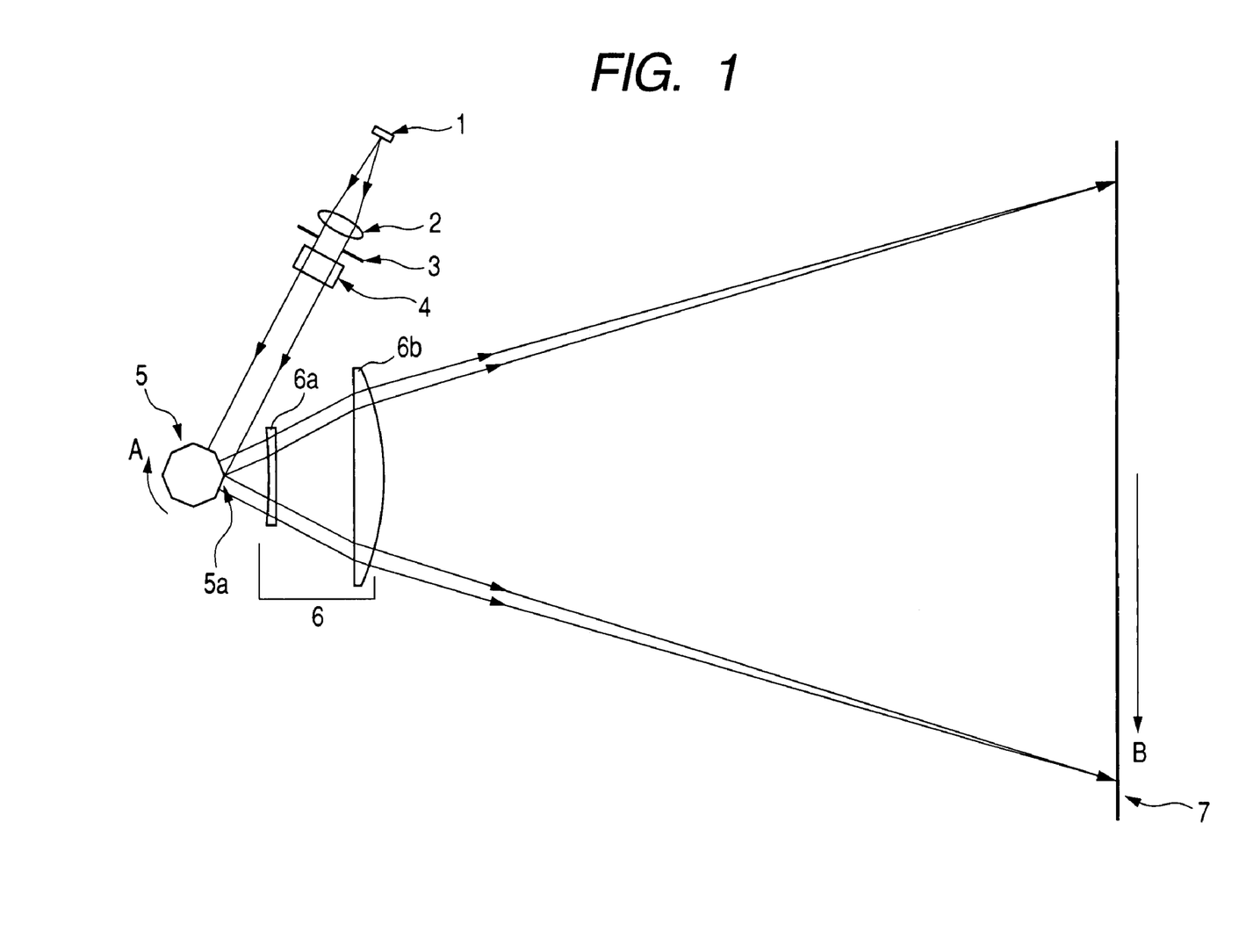
FIG. 1 is a main scanning sectional view of an optical scanning apparatus according to Embodiment 1 of the present invention.

FIG. 1 is a cross-sectional view (main scanning sectional view) of the essential portions of Embodiment 1 of the optical scanning apparatus of the present invention in a main scanning direction.

Here, the main scanning direction indicates a direction perpendicular to the rotary axis of deflecting means and the optical axis of a scanning optical element (a direction in which a light beam is reflected and deflected (deflected and scanned) by a light deflector), and a sub-scanning direction indicates a direction parallel to the rotary axis of the light deflector. Also, a main scanning section indicates a plane parallel to the main scanning direction and containing the optical axis of an imaging optical system. Also, a sub-scanning section indicates a section perpendicular to the main scanning section.

In FIG. 1, the reference numeral 1 designates light source unit comprising, for example, a semiconductor laser or the like. The reference numeral 2 denotes a light beam conversion element as an optical element, which converts a light beam emitted from the light source unit 1 into a convergent beam. The reference numeral 3 designates an aperture stop which limits the light beam emerging from the light beam conversion element 2 and shapes the beam shape thereof. The reference numeral 4 denotes an optical system (cylindrical lens) which has predetermined optical power only in the sub-scanning direction, and causes the light beam passed through the aperture stop 3 to be imaged as a substantially linear image on the deflection surface (reflection surface) 5a of a light deflector 5 which will be described later in the sub-scanning section. Each of the light beam conversion element 2, the aperture stop 3 and the cylindrical lens 4 constitutes an element of an incidence optical system.

The reference numeral 5 designates a light deflector which comprises, for example, a polygon mirror of an 8-surface construction (polygon mirror) and is rotated at a constant speed in the direction of arrow A in FIG. 1 by driving means (not shown) such as a motor.

The reference numeral 6 denotes an imaging optical system (scanning lens system) which has a light condensing function and an fθ characteristic and comprises first and second scanning lenses (fθ lenses) 6a and 6b, and which causes the convergent light beam based on image information reflected and deflected by the light deflector 5 to be imaged on a photosensitive drum surface 7 as a surface to be scanned, and brings the deflection surface 5a of the light deflector 5 and the photosensitive drum surface 7 into conjugate relationship with each other in the sub-scanning section, thereby having an optical face tangle error correction function.

The reference numeral 7 designates a photosensitive drum surface as a surface to be scanned.

In the present embodiment, a divergent light beam emitted from the semiconductor laser 1 in conformity with image information is converted into a convergent light beam by the light beam conversion element 2, has its cross-sectional shape limited by the aperture stop 3 and is incident on the cylindrical lens 4. The convergent light beam incident on the cylindrical lens 4 emerges therefrom in its intact state in the main scanning section, and is further converged in the sub-scanning section, and is imaged into a focal line shape extending long in the main scanning direction near the deflection surface 5a of the polygon mirror 5. The beam width in the main scanning section of the light beam at this time is set so as to be sufficiently wider than the facet width of the deflection surface 5a of the polygon mirror (overfilled optical system).

Then, the convergent light beam reflected and deflected by the deflection surface 5a of the polygon mirror 5 is imaged into a spot shape on the photosensitive drum surface 7 through the first and second scanning lenses 6a and 6b, and the photosensitive drum surface 7 is scanned with the light beam at a uniform speed in the direction of arrow B (main scanning direction) by the polygon mirror 5 being rotated in the direction of arrow A. Thereby, the image is recorded on the photosensitive drum surface 7 as a recording medium.

Figure 2:
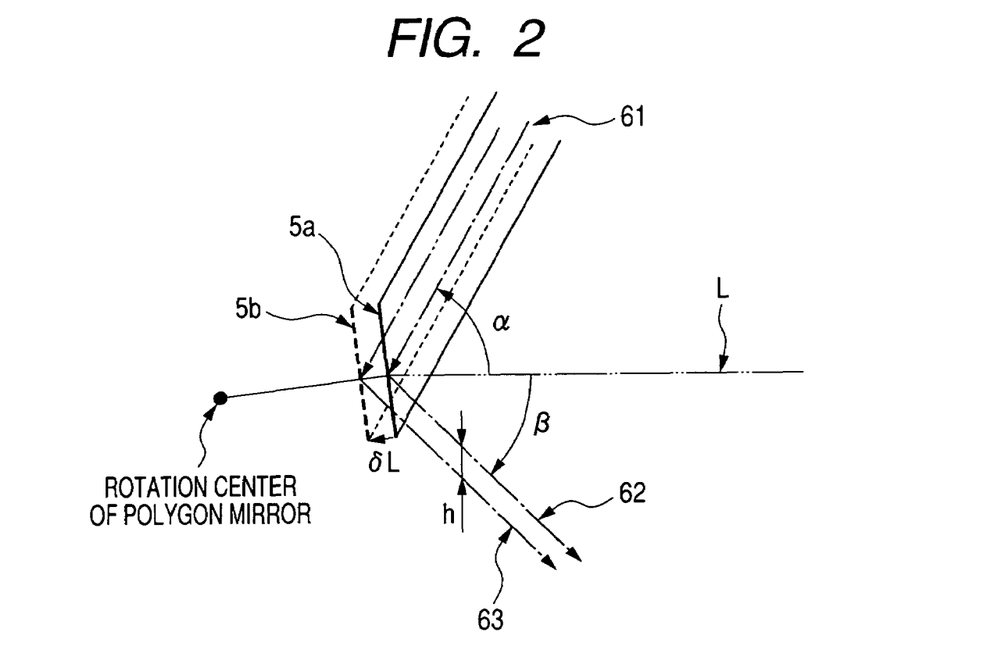
FIG. 2 illustrates the shift of a light beam when the distance from the rotation center to the deflection surface of a polygon mirror in Embodiment 1 of the present invention changes.

FIG. 2 is a schematic view of the essential portions around the deflection surface of the polygon mirror in the main scanning section, and shows the deflection surface 5a and the principal ray 61 of the convergent light beam incident on the deflection surface 5a and the principal ray 62 of the light beam reflected and deflected by the deflection surface 5a and travelling toward an imaging optical system (not shown).

Detailed description will hereinafter be made of the present embodiment with reference to FIG. 2.

In FIG. 2, the angle formed by the principal ray 61 of a convergent light beam emerging from the light beam conversion element (not shown) and the optical axis L of the imaging optical system (not shown) is defined as $\alpha$, and the angle formed by the principal ray 62 of the light beam reflected and deflected by the deflection surface 5a and travelling toward the imaging optical system is defined as $\beta$.

As regards the polygon mirror 5, unevenness occurs to the distances from the rotation center to the deflection surfaces of the polygon mirror, due to a mounting error when it is mounted on the shaft of driving means such as a motor, and the machining error or the like of the polygon mirror itself. Here, assuming here that unevenness of $\delta L$ has occurred between the deflection surface 5a and a deflection surface 5b differing therefrom.

In that case, the principal ray of a light beam reflected and deflected by the deflection surface 5b and reflected at the same angle as the principal ray 62 shifts by h in the main scanning direction as indicated by a ray 63 and is incident on the imaging optical system.

It can be seen from geometrical consideration that the above-mentioned shift amount h is represented by the relational expression that $$h = \delta L\left[\sin\left(\frac{\alpha}{2} - \frac{\beta}{2}\right) + \cos\left(\frac{\alpha}{2} - \frac{\beta}{2}\right)\tan\beta\right]. \quad (1)$$

A point to which particular attention should be paid here is that in an overfilled optical scanning apparatus, the width in the main scanning direction of the light beam incident on the polygon mirror 5 is set greater than the width of the deflection surface 5a of the polygon mirror 5 along the rotational direction hereof and therefore, the beam width of the light beam incident on the imaging optical system is determined by the width of the deflection surface 5a. Thus, at the same time as the principal ray 63 of the light beam reflected and deflected by the deflection surface 5b and reflected at the same angle as the principal ray 62 shifts in the main scanning direction and is incident on the imaging optical system, the principal ray of the light beam incident on the deflection surface 5b also shifts in the main scanning section.

Figure 3:
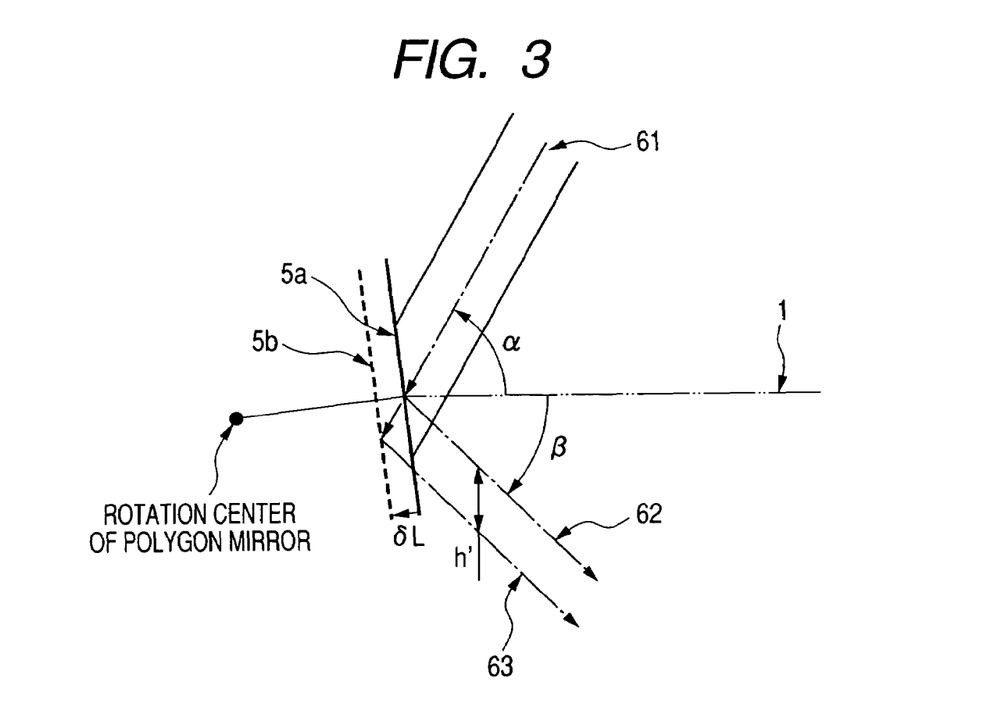
FIG. 3 illustrates the shift of a light beam when in an underfilled optical scanning apparatus, the distance from the rotation center to the deflection surface of the polygon mirror thereof changes.

FIG. 3 is a schematic view of the essential portions around the deflection surface of the polygon mirror of an underfilled optical scanning apparatus in the main scanning section, and shows the deflection surface 5a and the states of the principal ray 61 of the convergent light beam incident on the deflection surface 5a and the principal ray 62 of the light beam reflected and deflected by the deflection surface 5a and travelling toward the imaging optical system (not shown).

Again in the underfilled optical scanning apparatus, when as described in connection with FIG. 2, unevenness of δL has occurred between the deflection surface 5a and the deflection surface 5b differing therefrom, the principal ray of the light beam reflected and deflected by the deflection surface 5b and reflected at the same angle as the principal ray 62 shifts by h' in the main scanning direction as indicated by a ray 63 and is incident on the imaging optical system.

It can be seen from geometrical consideration that the above-mentioned shift amount h' is represented by the relational expression that $$h' = \delta L\left[\frac{\sin\alpha}{\cos\left(\frac{\alpha}{2} + \frac{\beta}{2}\right)} + \frac{\cos\alpha\tan\beta}{\cos\left(\frac{\alpha}{2} + \frac{\beta}{2}\right)}\right]. \quad (2)$$

A point to which attention should be paid here is that the principal ray 63 of the light beam reflected and deflected by the deflection surface 5b and reflected at the same angle as the principal ray 62 shifts in the main scanning direction and is incident on the imaging optical system 6, but the principal ray of the light beam incident on the deflection surface 5b does not shift in the main scanning section.

This is because in the underfilled optical scanning apparatus, the width in the main scanning direction of the light beam incident on the polygon mirror 5 is set smaller than the width along the rotational direction of the deflection surface of the polygon mirror 5 and therefore, the beam width of the light beam incident on the imaging optical system 6 is not determined by the width of the deflection surface.

Comparing FIGS. 2 and 3 with each other, it is expected that the shift amount h is apparently smaller than the shift amount h'.

Figure 4:
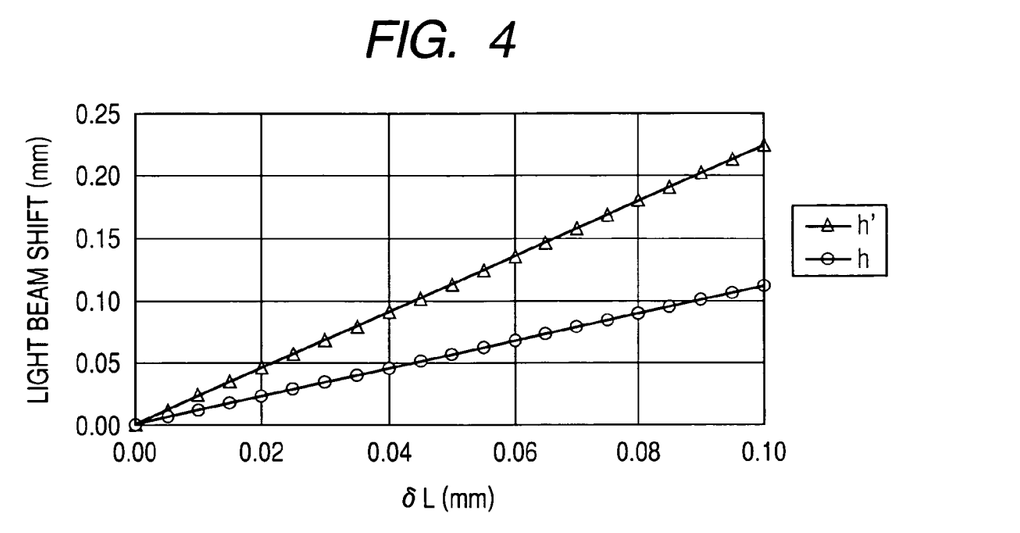
FIG. 4 is a graph showing the relations between the unevenness amount of the distance from the rotation center to each deflection surface of the polygon mirror in the underfilled optical scanning apparatus and the shift amount of the light beam, and between the unevenness amount of the distance from the rotation center to each deflection surface of a polygon mirror in an overfilled optical scanning apparatus and the shift amount of a light beam.

FIG. 4 shows, in accordance with the above-mentioned expressions (1) and (2), the relations between the unevenness amount δL of the distances from the rotation center to the deflection surfaces of the polygon mirror and the shift amount h of the light beam incident on the imaging optical system in the underfilled optical scanning apparatus and between the unevenness amount δL of the distances from the rotation center to the deflection surfaces of the polygon mirror and the shift amount h' of the light beam incident on the imaging optical system in the overfilled optical scanning apparatus.

Here, the values when α=60° and β=45° are shown here as an example. Also, it is assumed that the sign of β is plus in the case of a clockwise direction with the optical axis of the imaging optical system as the reference.

As can be seen also from FIG. 4, the overfilled optical scanning apparatus is smaller in the shift amount of the light beam relative to the unevenness amount δL of the distances from the rotation center to the respective surfaces of the polygon mirror.

Figure 5:
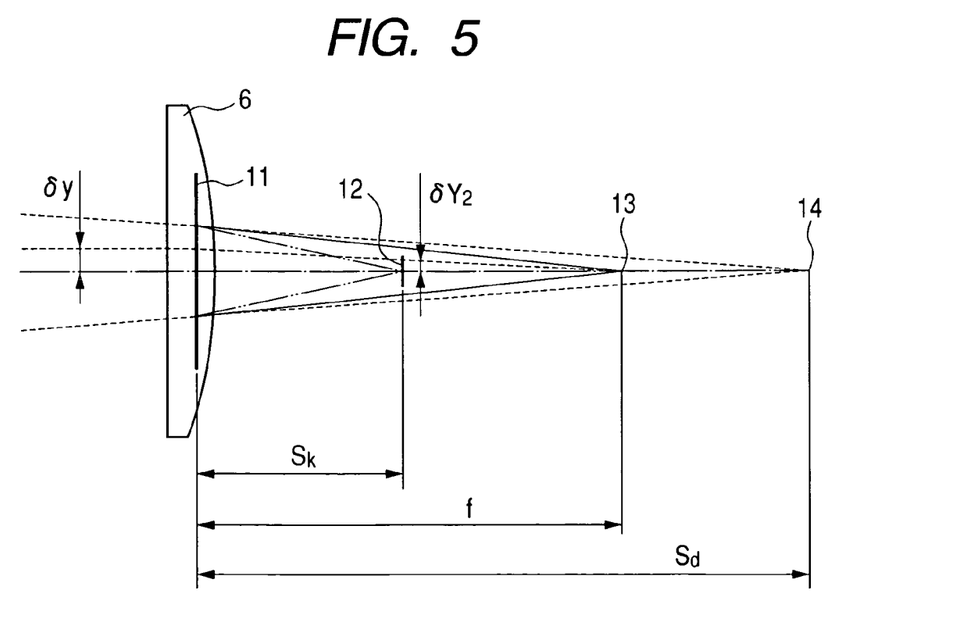
FIG. 5 illustrates the phenomenon that positional deviation occurs to an imaged spot on a surface to be scanned in a case where unevenness exists in the distances from the rotation center to the plurality of deflection surfaces of a polygon mirror when a light beam incident on an imaging optical system is a convergent light beam.

Reference is now had to FIG. 5 to describe the phenomenon that positional deviation occurs to an imaged spot on the surface to be scanned if the unevenness amount δL exists in the distances from the rotation center to the plurality of deflection surfaces of the polygon mirror when generally the light beam incident on the imaging optical system is a light beam convergent in the main scanning section (convergent light beam).

FIG. 5 is a cross-sectional view of essential portions for illustrating this phenomenon.

In FIG. 5, the reference numeral 6 designates an fθ lens as the imaging optical system, and the distance from the rear side principal plane position of the fθ lens 6 to the natural converging point of the convergent light beam incident on the fθ lens 6 is defined as Sd, the focal length of the fθ lens 6 is defined as f, and the distance from the rear side principal plane position of the fθ lens 6 to a position at which the convergent light beam incident on the fθ lens 6 is converged and imaged by the fθ lens 6 is defined as Sk.

Here, $$\frac{1}{Sk} = \frac{1}{Sd} + \frac{1}{f} \quad (3)$$

and hence, f is represented by $$f = \frac{Sd \times Sk}{Sd - Sk}. \quad (4)$$

Here, if there exists the shift amount δy of the light beam relative to the unevenness amount δL of the distances between the rotation center and the deflection surfaces of the polygon mirror in the main scanning section, as is apparent from FIG. 5, the deviation amount δY2 of the imaged position of a spot in the main scanning direction on the surface to be scanned becomes $$\delta Y2 = \frac{f - Sk}{f} \times \delta y = \left[1 - \frac{Sk}{f}\right]\delta y. \quad (5)$$

This means that in view of the fact that the overfilled optical scanning apparatus is smaller in the shift amount δy of the light beam relative to the unevenness amount δL of the distances from the rotation center to the deflection surfaces of the polygon mirror in the main scanning section, when the light beam incident on the fθ lens 6 is a light beam convergent in the main scanning direction, the overfilled optical scanning apparatus is smaller in the positional deviation of the imaged spot on the surface to be scanned occurring when the unevenness amount δL exists in the distances between the rotation center and the plurality of deflection surfaces of the polygon mirror.

That is, it can be seen that if the allowable amount of the positional deviation of the imaged spot on the surface to be scanned is the same, the overfilled optical scanning apparatus can cause a stronger convergent light beam to be incident than the underfilled optical scanning apparatus, and it becomes possible to further shorten the distance from the polygon mirror to the surface to be scanned.

From expressions (1) and (5), the positional deviation amount δ of the imaged spot on the surface to be scanned in the overfilled optical scanning apparatus is represented by $$\delta = \left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right]. \quad (6)$$

On the other hand, the positional deviation amount δ of the imaged spot on the surface to be scanned becomes easy to be visually recognized if it exceeds ⅓ of the pixel interval in the main scanning direction generally determined from image resolution, and therefore, it is necessary to make it equal to or smaller than that.

For example, in the case of the resolution of an image of 600 DPI, it is necessary to make the positional deviation amount δ of the imaged spot equal to or smaller than $$\frac{25.4}{3N_M} = 0.01411 \text{ mm.}$$

Accordingly, in the overfilled optical scanning apparatus according to the present embodiment, the following conditional expression is satisfied:

$$\left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right] < \frac{25.4}{3N_M}, \quad (7)$$

where f is the focal length of the imaging optical system in the main scanning direction, Sk is the distance from the rear side principal plane position of the imaging optical system in the main scanning section to an imaging point at which the convergent light beam is imaged by the imaging optical system, α is an angle formed by the optical axis of the imaging optical system in the main scanning section and by the principal ray of the light beam incident on the light deflector, β is an angle formed by the optical axis of the imaging optical system in the main scanning section and the principal ray of the light beam reflected at any angle by the light deflector, δL is the unevenness amount of the distances from the rotation center of the light deflector defined in the main scanning section to the plurality of deflection surfaces, and $N_M$ is the number of pixels per one inch in the main scanning direction on the surface to be scanned determined from the resolution of an image in the main scanning direction.

More preferably, the conditional expression (7) may be set as follows:

$$\left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right] < \frac{25.4}{4N_M} \quad (7a)$$

Thereby, there is achieved a compact overfilled optical scanning apparatus which effectively mitigates the positional deviation of the imaged spot on the surface to be scanned when the unevenness amount δL exists in the above-described distances from the rotation center to the plurality of deflection surfaces of the polygon mirror, and is greater in the rate of shortening of the optical path length as compared with the case of the underfilled optical scanning apparatus.

The configuration data of the overfilled optical scanning apparatus according to the present embodiment will be shown below.

the focal length f of the imaging optical system 6 in the main scanning section: 273.3 mm the distance Sk from the rear side principal plane of the imaging optical system 6 to the imaging point at which the convergent light beam is imaged by the imaging optical system 6: 205 mm the angle α formed in the main scanning section by the optical axis L of the imaging optical system 6 and the principal ray of the light beam incident on the polygon mirror 5: 60° the angle (scanning angle) β formed in the main scanning section by the optical axis L of the imaging optical system 6 and the principal ray of the light beam reflected and deflected by the polygon mirror 5: −32.5° to +32.5° the unevenness amount δL of the distances from the rotation center to the plurality of deflection surfaces of the polygon mirror 5: 0.03 mm the number of pixels $N_M$ per one inch in the main scanning direction on the surface 7 to be scanned determined from the resolution of the image in the main scanning direction: 600

Figure 6:
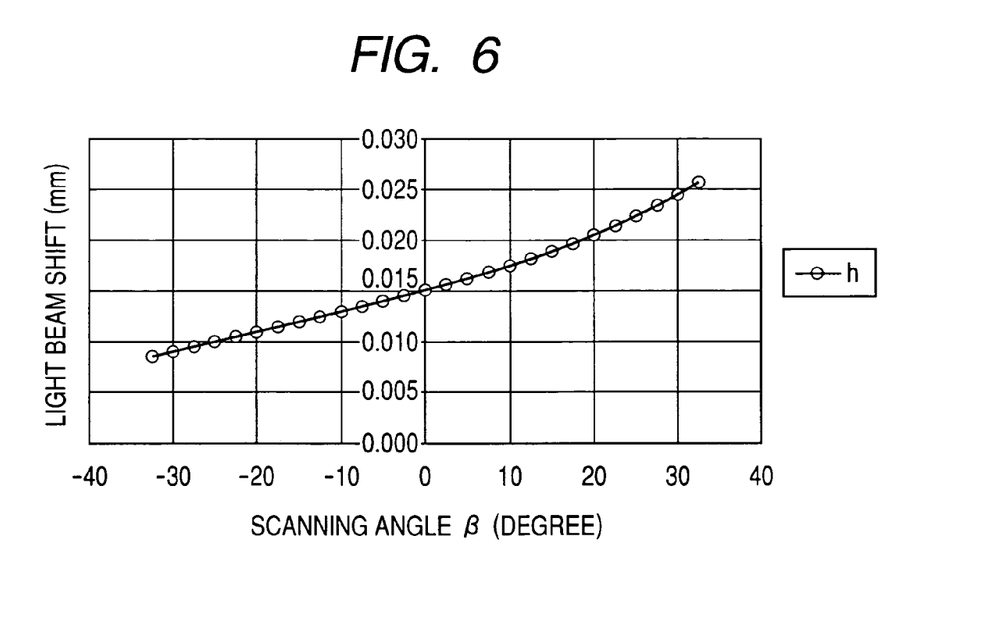
FIG. 6 is a graph showing the relation between a scanning angle and the shift amount of a light beam in Embodiment 1 of the present invention.

FIG. 6 is a graph showing the relation between the scanning angle β and the shift amount h of the light beam in the overfilled optical scanning apparatus of the above-described configuration.

Figure 7:
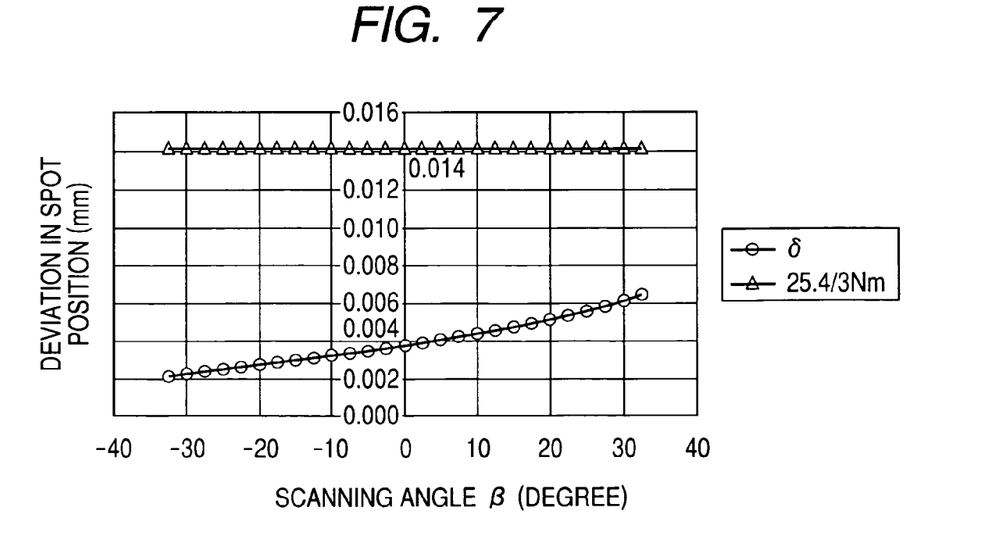
FIG. 7 is a graph showing the scanning angle and a positional deviation amount of an imaged spot on a surface to be scanned in Embodiment 1 of the present invention.

FIG. 7 is a graph likewise showing the relation between the scanning angle β and the positional deviation amount $$\delta = \left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right]$$

of the imaged spot on the surface to be scanned.

As can be seen from FIG. 7, the overfilled optical scanning apparatus according to the present embodiment satisfies the above-mentioned conditional expression (7), and succeeds in causing the convergent light beam to be incident on the imaging optical system 6 to thereby shorten the distance from the rear side principal plane of the imaging optical system 6 to the surface 7 to be scanned to 205/273.3=0.7501 time as great as that when an ordinary parallel light beam is caused to be incident, and effectively mitigate the positional deviation of the imaged spot on the surface 7 to be scanned occurring due to the unevenness of the distances from the rotation center to the plurality of deflection surfaces of the polygon mirror 5.

Embodiment 2

Embodiment 2 of the present invention will now be described.

The difference of this embodiment from the aforedescribed Embodiment 1 is that the angle α formed by the optical axis L of the imaging optical system 6 and the principal ray of the light beam incident on the polygon mirror when the light beam is projected into the main scanning section is set to 0° (configured in front incidence system in which the light beam emitted from the light source unit is incident on the deflection surface of the light deflector from the center of the deflecting angle of the light deflector when projected into the main scanning section), and the light beam is caused to be incident on the deflection surface of the light deflector so as to be incident on the deflection surface at a predetermined angle with respect to a plane orthogonal to the rotary axis of the light deflector in the sub-scanning section. In the other points, the construction and optical action of the present embodiment are substantially similar to those of Embodiment 1, whereby a similar effect is obtained. At this time, the aforedescribed angle β is the value when the light beam has been projected into the main scanning section.

The configuration data of the overfilled optical scanning apparatus according to the present embodiment will now be shown.

the focal length f of the imaging optical system 6 in the main scanning section: 273.3 mm the distance Sk from the rear side principal plane of the imaging optical system 6 to the imaging point at which the convergent light beam is imaged by the imaging optical system 6: 205 mm the angle α formed in the main scanning section by the optical axis of the imaging optical system 6 and the principal ray of the light beam incident on the polygon mirror 5: 0° the angle (scanning angle) β formed in the main scanning section by the optical axis L of the imaging optical system 6 and the principal ray of the light beam reflected and deflected by the polygon mirror 5: −32.5° to +32.5° the unevenness amount δL of the distances from the rotation center to the plurality of deflection surfaces of the polygon mirror 5: 0.03 mm the number of pixels NM per one inch in the main scanning direction on the surface 7 to be scanned determined from the resolution of the image in the main scanning direction: 600

In the present embodiment, the angle α formed in the main scanning section by the optical axis L of the imaging optical system 6 and the principal ray of the light beam incident on the polygon mirror 5 is set to 0°. By adopting such a configuration, it is possible to make the shift amount h of the light beam small.

Figure 8:
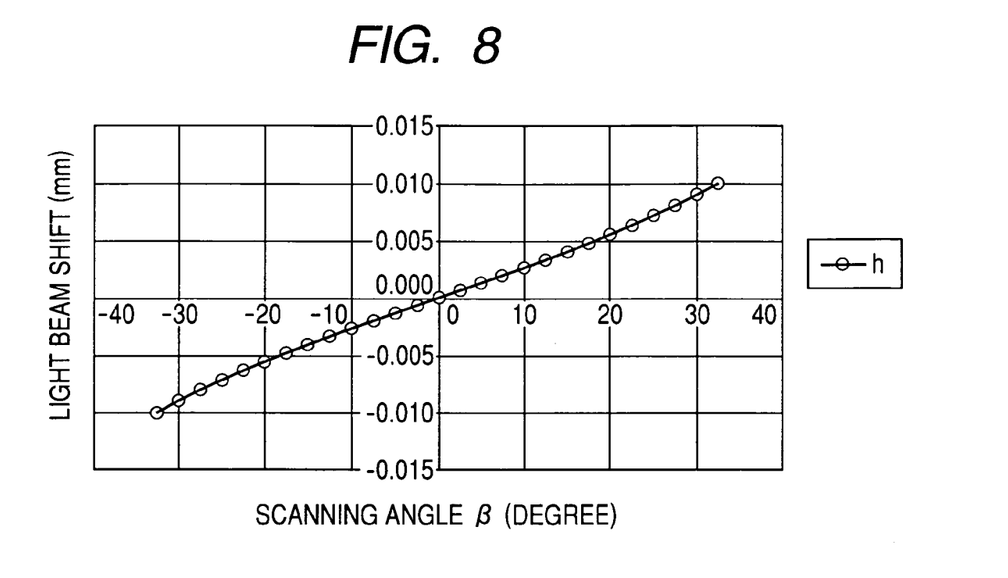
FIG. 8 is a graph showing the relation between a scanning angle and the shift amount of a light beam in Embodiment 2 of the present invention.

FIG. 8 is a graph showing the relation between the scanning angle β and the shift amount h of the light beam in the overfilled optical scanning apparatus of the configuration of the present embodiment.

Figure 9:
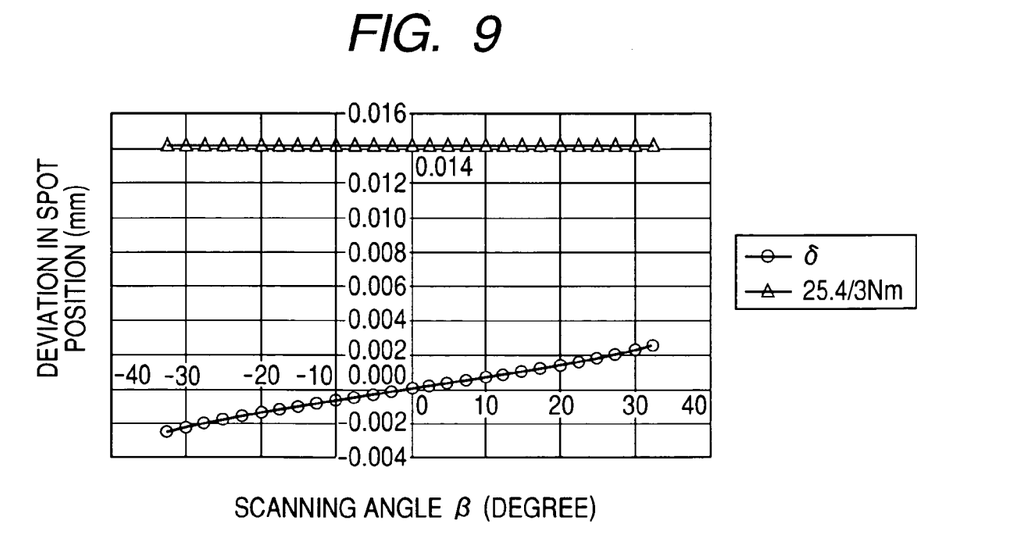
FIG. 9 is a graph showing the scanning angle and the positional deviation amount of an imaged spot on a surface to be scanned in Embodiment 2 of the present invention.

FIG. 9 is a graph likewise showing the relation between the scanning angle β and the positional deviation amount $$\delta = \left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right]$$

of the imaged spot on the surface to be scanned.

As can be seen from FIG. 8, in the present embodiment, design is made such that the angle α formed in the main scanning section by the optical axis L of the imaging optical system 6 and the principal ray of the light beam incident on the polygon mirror 5 is 0°, and therefore, as compared with the aforedescribed Embodiment 1, the shift amount h of the light beam can be made still smaller.

Accordingly, as shown in FIG. 9, the overfilled optical scanning apparatus according to the present embodiment satisfies the above-mentioned conditional expression (7) as a matter of course, and succeeds in more effectively mitigating the positional deviation of the imaged spot on the surface 7 to be scanned.

Also, it is generally known that the overfilled optical scanning apparatus has the characteristics that the spot diameter in the main scanning direction is somewhat enlarged in a scanning end portion and that the quantity of light is liable to decrease, however, if as in the present embodiment, there is adopted such a configuration that the angle α formed in the main scanning section by the optical axis L of the imaging optical system 6 and the principal ray of the light beam incident on the polygon mirror 5 becomes 0°, there is also obtained the effect that the above-mentioned enlargement of the spot diameter and the decrease in the quantity of light can be minimized.

Embodiment 3

Embodiment 3 of the present invention will now be described.

The difference of this embodiment from the aforedescribed Embodiment 1 is that the angle α formed by the optical axis L of the imaging optical system 6 and the principal ray of the light beam incident on the polygon mirror 5 when the light beam is projected into the main scanning section is set to 0° (configured in front incidence system in which the light beam emitted from the light source unit is incident on the deflection surface of the deflector from the center of the deflecting angle of the light deflector when projected into the main scanning section), and further the distance Sk from the rear side principal plane of the imaging optical system 6 to the imaging point at which the convergent light beam is imaged by the imaging optical system 6 is set to 135 mm. In the other points, the configuration and optical action of the present embodiment are substantially similar to those of Embodiment 1, whereby a similar effect is obtained.

The construction data of the overfilled optical scanning apparatus according to the present embodiment will now be shown.

the focal length f of the imaging optical system 6 in the main scanning section: 273.3 mm the distance Sk from the rear side principal plane of the imaging optical system 6 to the imaging point at which the convergent light beam is imaged by the imaging optical system 6: 135 mm the angle α formed in the main scanning section by the optical axis L of the imaging optical system 6 and the principal ray of the light beam incident on the polygon mirror 5: 0° the angle (scanning angle) β formed in the main scanning section by the optical axis L of the imaging optical system 6 and the principal ray of the light beam reflected and deflected by the polygon mirror 5: −32.5° to +32.5° the unevenness amount δL of the distances from the rotation center to the plurality of deflection surfaces of the polygon mirror 5: 0.03 mm the number of pixels $N_M$ per one inch in the main scanning direction on the surface 7 to be scanned determined from the resolution of the image in the main scanning direction: 600

In the present embodiment, as described above, the angle α formed in the main scanning section by the optical axis L of the imaging optical system 6 and the principal ray of the light beam incident on the polygon mirror 5 is set to 0°, and further the distance Sk from the rear side principal plane of the imaging optical system 6 to the imaging point at which the convergent light beam is imaged by the imaging optical system 6 is set to 135 mm. By adopting such a configuration, the shift amount h of the light beam is made small and the distance from the rear side principal plane of the imaging optical system 6 to the surface 7 to be scanned is shortened, thereby achieving the further downsizing of the optical scanning apparatus.

Figure 10:
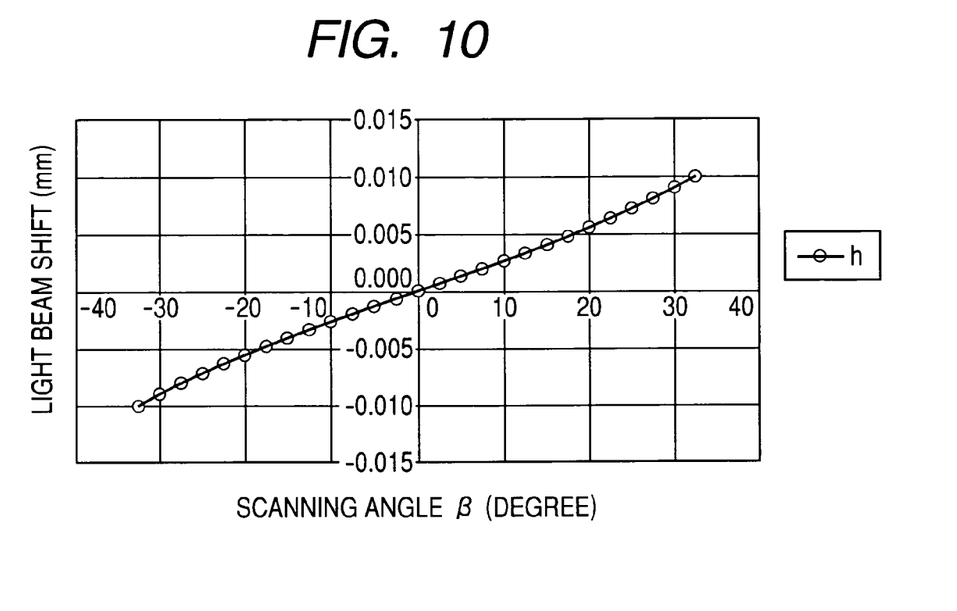
FIG. 10 is a graph showing the relation between a scanning angle and the shift amount of a light beam in Embodiment 3 of the present invention.

FIG. 10 is a graph showing the relation between the scanning angle and the shift amount h of the light beam in the overfilled optical scanning apparatus of the configuration of the present embodiment.

Figure 11:
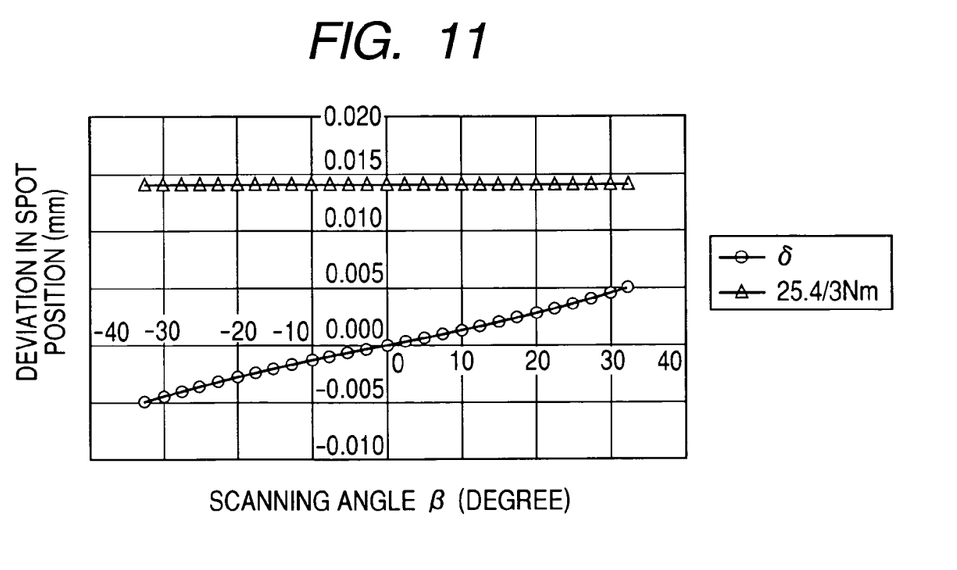
FIG. 11 is a graph showing the scanning angle and the positional deviation amount of an imaged spot on a surface to be scanned in Embodiment 3 of the present invention.

FIG. 11 is a graph likewise showing the relation between the scanning angle and the positional deviation amount $$\delta = \left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right]$$

of the imaged spot on the surface to be scanned.

As can be seen from FIG. 11, the overfilled optical scanning apparatus according to the present embodiment satisfies the above-mentioned conditional expression (7), and as compared with Embodiment 2, makes it possible to greatly shorten the distance from the rear side principal plane of the imaging optical system 6 to the surface 7 to be scanned to 135/273.3=0.494 time as great as that when an ordinary parallel light beam is caused to be incident.

As described above, in the present embodiment, there is adopted such a configuration of the overfilled optical scanning apparatus as satisfies the above-mentioned conditional expression (7), whereby it becomes possible to provide a high-performance and compact overfilled optical scanning apparatus which can effectively mitigate the positional deviation of the imaged spot on the surface 7 to be scanned when the unevenness amount δL exists in the distances from the rotation center to the plurality of deflection surfaces of the polygon mirror 5, and can make the rate of the shortening of the optical path length still greater as compared with the case of the underfilled optical scanning apparatus.

The value (1−Sk/f) in the above-mentioned conditional expression (7) means the degree of convergence of the light beam made incident on the imaging optical system 6, and the greater this value becomes, the stronger the degree of convergence becomes, and it becomes possible to gain the effect of shortening the optical path length.

On the other hand, the above-mentioned value (1−Sk/f) also has the meaning that how many times the shift amount h of the light beam is reduced on the surface 7 to be scanned relative to the unevenness amount δL of the distances from the rotation center to the deflection surfaces of the polygon mirror 5.

For example, in Embodiment 1 and Embodiment 2 of the present invention, $$1 - \frac{Sk}{f} = 1 - \frac{205}{273.3} = 0.2499$$

and the shift amount h of the light beam relative to the unevenness amount δL of the distances from the rotation center to the deflection surfaces of the polygon mirror 5 is reduced to 0.2499 time on the surface 7 to be scanned, thereby effectively reducing the positional deviation of the imaged spot on the surface 7 to be scanned.

Also, in Embodiment 3 of the present embodiment, likewise, $$1 - \frac{Sk}{f} = 1 - \frac{135}{273.3} = 0.506$$

and the shift amount h of the light beam relative to the unevenness amount δL of the distances from the rotation center to the deflection surfaces of the polygon mirror 5 is reduced to 0.506 time on the surface 7 to be scanned.

As described above, the smaller the value (1−Sk/f) is, the smaller the positional deviation of the imaged spot on the surface 7 to be scanned can be made. However, if the value is set too small, the degree of convergence of the light beam caused to be incident on the imaging optical system 6 will become weak and it will become impossible to obtain the effect of shortening the optical path length.

So, in each embodiment, each element is set so that the above-mentioned value (1−Sk/f) may satisfy the following conditional expression (8):

$$0.24 < 1 - \frac{Sk}{f} \le 1.0 \tag{8}$$

More preferably, the lower limit value of the conditional expression (8) may be 0.245.

Still more preferably, the conditional expression (8) may be set as follows:

$$0.25 \le 1 - \frac{Sk}{f} \le 0.6 \tag{8a}$$

If the value (1−Sk/f) is less than the lower limit value of the above-mentioned conditional expression (8), the degree of convergence of the light beam to be incident on the imaging optical system becomes weak and it becomes impossible to obtain the effect of shortening the optical path length, and this is not good. Also, if the value (1−Sk/f) is greater than the upper limit value of the conditional expression (8), the positional deviation of the imaged spot on the surface to be scanned becomes liable to exceed an allowable range, and this is not good.

The values of (1−Sk/f) in Embodiments 1 to 3 of the present invention are shown below.

Embodiment 1

$$1 - \frac{Sk}{f} = 1 - \frac{205}{273.3} = 0.2499$$

Embodiment 2

$$1 - \frac{Sk}{f} = 1 - \frac{205}{273.3} = 0.2499$$

Embodiment 3

$$1 - \frac{Sk}{f} = 1 - \frac{135}{273.3} = 0.506$$

It will be seen that in any one of Embodiments 1 to 3, the conditional expression (8) is satisfied.

While in each embodiment, the imaging optical system 6 is comprised of two lenses, this is not restrictive, but the imaging optical system 6 may be comprised of e.g. a single lens or three or more lenses. Also, the imaging optical system may be constituted by including a diffraction optical element.

Also, while in each of the aforedescribed embodiments, 600, i.e., 600 DPI, is mentioned as an example of "the number of pixels NM per one inch in the main scanning direction on the surface 7 to be scanned determined from the resolution of the image in the main scanning direction", of course, the present invention is not restricted to 600 DPI. For example, in Embodiment 2, as can be seen also from FIG. 9, the positional deviation amount of the spot is within a range of ±3 µm. Consequently, in the optical system of Embodiment 2, it will be understood that the value of "the number of pixels NM per one inch in the main scanning direction on the surface 7 to be scanned determined from the resolution of the image in the main scanning direction" may be 1200 or greater, i.e., 1200 DPI or greater. (The value of the right side of the conditional expression when the value of $N_M$ is 1200 is 0.007055. The value of the right side of the conditional expression when the value of $N_M$ is 2400 is 0.003528 and therefore, the optical system of Embodiment 2 satisfies the conditional expression even in the case of 2400 DPI.)

The present invention can obtain a better effect in an image forming apparatus wherein the resolution is 1200 dpi or greater.

Also, in each embodiment, the effect of the present invention is equally displayed even if the number of light emitting points emitting the light beam of the light source unit is one or plural (two or more light emitting points) and therefore, the present invention does not care about the number of the light emitting points emitting the light beam of the light source unit.

According to the present invention, particularly in an overfilled optical scanning apparatus, in which the optical path length is liable to become long, a convergent light beam is made incident on an imaging optical system, to thereby achieve a high-performance and compact overfilled optical scanning apparatus which can effectively mitigate the positional deviation of an imaged spot on a surface to be scanned when an unevenness amount exists in the distances from the rotation center to the plurality of deflection surfaces of a light deflector, and can make the rate of shortening of an optical path length in comparison with the case of an underfilled optical scanning apparatus still greater, and an image forming apparatus using the same.

Also, such amounts as the focal length of the imaging optical system in the main scanning section, the distance from the rear side principal plane position of the imaging optical system to the imaging point at which the convergent light beam is imaged by the imaging optical system, the angle formed by the optical axis of the imaging optical system and the principal ray of the light beam incident on the light deflector, and the angle (scanning angle) formed by the optical axis of the imaging optical system and the light beam reflected and deflected by the light deflector are set to respective optimum conditions in conformity with the unevenness amount of the distances from the rotation center to the plurality of deflection surfaces of the light deflector and the resolution in the main scanning direction, to whereby achieve more efficiently a high-performance and compact overfilled optical scanning apparatus and an image forming apparatus using the same.

(Image Forming Apparatus)

Figure 12:
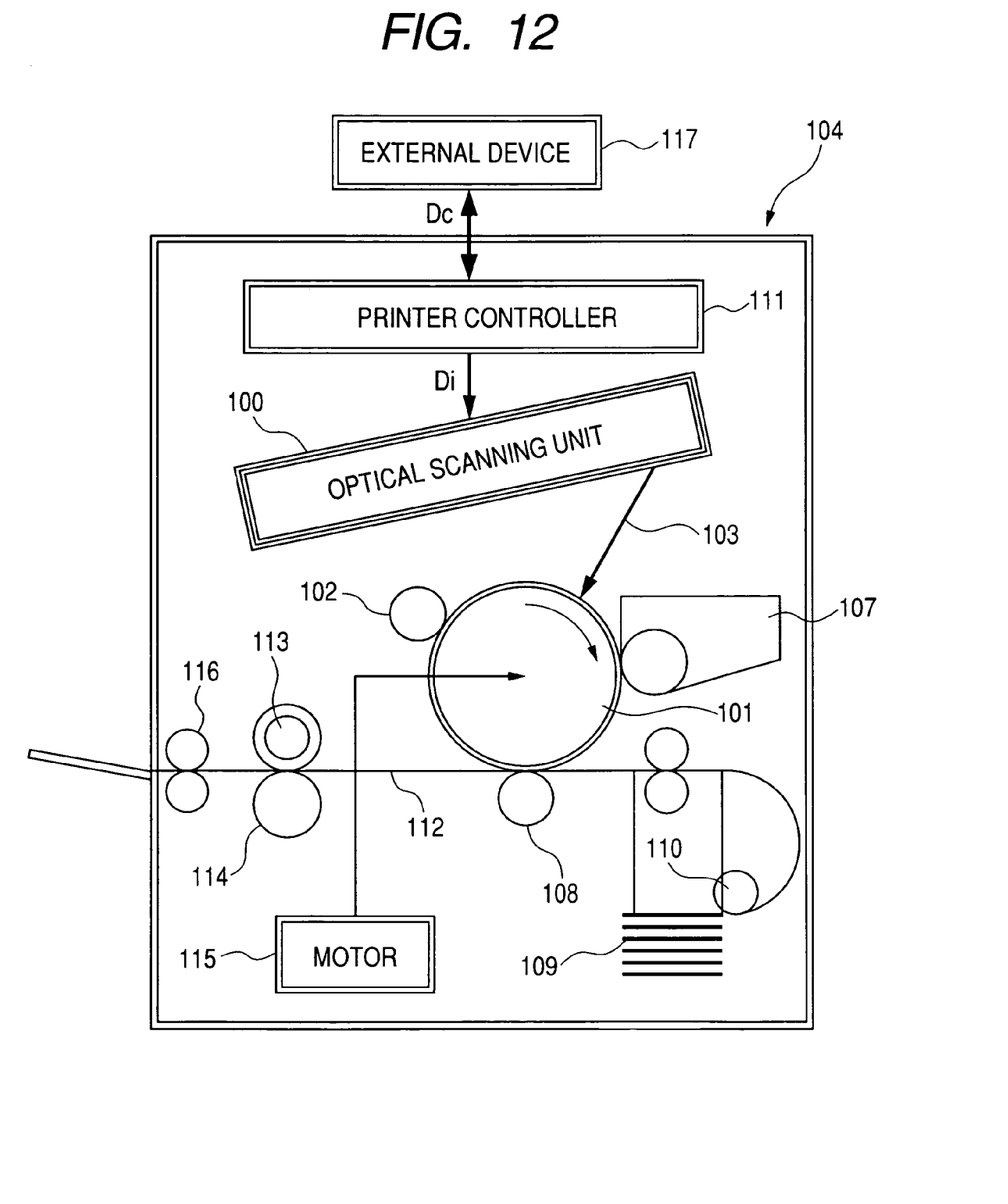
FIG. 12 shows an embodiment of the image forming apparatus of the present invention.

FIG. 12 is a cross-sectional view in a sub-scanning direction showing the essential portions of an embodiment of the image forming apparatus. In FIG. 12, the reference numeral 104 designates the image forming apparatus. Code data Dc is inputted from an external device 117 such as a personal computer to this image forming apparatus 104. This code data Dc is converted into image data (dot data) Di by a printer controller 111 in the image forming apparatus. This image data Di is inputted to an optical scanning unit 100 having the configuration shown in any one of Embodiments 1 to 3. A light beam 103 modulated in conformity with the image data Di is emitted from this optical scanning unit 100, and the photosensitive surface of a photosensitive drum 101 is scanned in the main scanning direction by this light beam 103.

The photosensitive drum 101 which is an electrostatic latent image bearing member (photosensitive member) is clockwisely rotated by a motor 115. With this rotation, the photosensitive surface of the photosensitive drum 101 is moved relative to the light beam 103 in the sub-scanning direction orthogonal to the main scanning direction. Above the photosensitive drum 101, a charging roller 102 for uniformly charging the surface of the photosensitive drum 101 is provided so as to contact with the surface thereof. Design is made such that the light beam 103 scanned by the aforementioned optical scanning unit 100 is applied to the surface of the photosensitive drum 101 charged by the charging roller 102.

As previously described, the light beam 103 is modulated on the basis of the image data Di, and this light beam 103 is applied to the surface of the photosensitive drum 101 to thereby form an electrostatic latent image thereon. This electrostatic latent image is developed as a toner image by a developing device 107 disposed further downstream of the applied position of the light beam 103 with respect to the rotational direction of the photosensitive drum 101 so as to abut against the photosensitive drum 101.

The toner image developed by the developing device 107 is transferred to a sheet 112, which is a material to be transferred, by a transfer roller 108 disposed below the photosensitive drum 101 so as to be opposed to the photosensitive drum 101. Sheets 112 are contained in a sheet cassette 109 disposed forwardly (on the right side as viewed in FIG. 12) of the photosensitive drum 101, however, they can also be manually fed. A sheet feeding roller 110 is disposed on an end portion of the sheet cassette 109 and feeds the sheets 112 in the sheet cassette 109 into a conveying path.

The sheet 112 to which the unfixed toner image has been transferred in the manner described above is further conveyed to a fixing device disposed rearwardly (on the left side as viewed in FIG. 12) of the photosensitive drum 101. The fixing device is comprised of a fixing roller 113 having a fixing heater (not shown) therein, and a pressure roller 114 disposed so as to be in pressure contact with this fixing roller 113, and heats the sheet 112 conveyed from the transferring portion while pressuring the sheet 112 by the pressure contact portion between the fixing roller 113 and the pressure roller 114, thereby fix the unfixed toner image on the sheet 112. Further, sheet discharging rollers 116 are disposed on the rear side of the fixing roller 113, and discharge the sheet 112 having had the toner image fixed thereon out of the image forming apparatus.

Although not shown in FIG. 12, the printer controller 111 effects not only the conversion of the aforedescribed data, but also the control of various portions in the image forming apparatus including a motor 115, and a polygon motor in the optical scanning unit which will be described later.

(Color Image Forming Apparatus)

Figure 13:
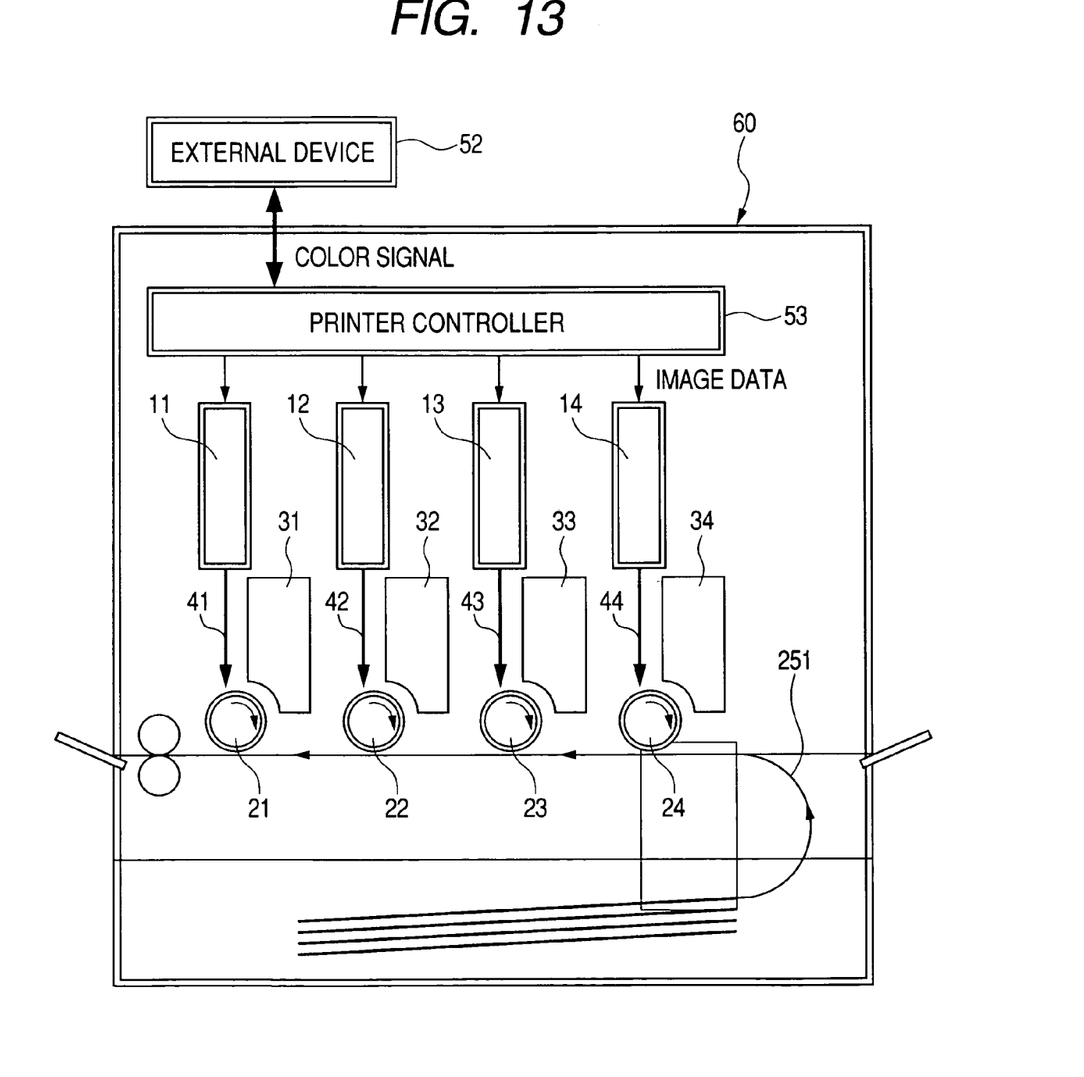
FIG. 13 is a schematic view showing the essential portions of an embodiment of the color image forming apparatus of the present invention.

FIG. 13 is a schematic view of the essential portions of a color image forming apparatus according to an embodiment of the present invention. This embodiment is a color image forming apparatus of a tandem type in which four optical scanning apparatuses are arranged side by side and image information is recorded on the surfaces of photosensitive drums which are image bearing members in parallel. In FIG. 13, the reference numeral 60 designates the color image forming apparatus, the reference numerals 11, 12, 13 and 14 denote optical scanning apparatuses having the construction shown in any one of Embodiments 1 to 3, the reference numerals 21, 22, 23 and 24 designate photosensitive drums as image bearing members, the reference numerals 31, 32, 33 and 34 denote developing devices, and the reference numeral 51 designates a conveying belt.

In FIG. 13, R (red), G (green) and B (blue) color signals are inputted from an external device 52 such as a personal computer to the color image forming apparatus 60. These color signals are converted into C (cyan), M (magenta), Y (yellow) and B (black) image data (dot data) by a printer controller 53 in the color image forming apparatus. These image data are inputted to the optical scanning apparatuses 11, 12, 13 and 14, respectively. Light beams 41, 42, 43 and 44 modulated in conformity with the respective image data are emitted from these optical scanning apparatuses, and by these light beams, the photosensitive surfaces of the photosensitive drums 21, 22, 23 and 24 are scanned in the main scanning direction.

The color image forming apparatus according to the present embodiment is such that the four optical scanning apparatuses (11, 12, 13 and 14) are arranged side by side and respective ones of these correspond to C (cyan), M (magenta), Y (yellow) and B (black) colors, and record image signals (image information) on the surfaces of the photosensitive drums 21, 22, 23 and 24 in parallel to thereby print a color image at a high speed.

The color image forming apparatus according to the present embodiment, as described above, forms latent images of the respective colors on the surfaces of the corresponding photosensitive drums 21, 22, 23 and 24 by the four optical scanning apparatuses 11, 12, 13 and 14 by the use of the light beams based on the respective image data. Thereafter, the images are multiplexly transferred to a recording material to thereby form a sheet of full-color image.

As the external device 52, use may be made, for example, of a color image reading apparatus provided with a CCD sensor. In this case, a color digital copying machine is constituted by this color image reading apparatus and the color image forming apparatus 60.

This application claims priority from Japanese Patent Application No. 2004-164645 filed Jun. 2, 2004, which is hereby incorporated by reference herein.

What is claimed is:

1. An optical scanning apparatus having light source unit, a light deflector having a plurality of deflection surfaces, an incidence optical system for causing a light beam emitted from the light source unit to be incident on the deflection surface of the light deflector in a converged state with a light beam width wider than the width of the deflection surface in a main scanning section, and an imaging optical system for imaging the light beam reflected by the light deflector on a surface to be scanned, wherein the following condition is satisfied:

$$\left(1 - \frac{Sk}{f}\right)\delta L\left[\sin\left(\frac{\alpha}{2} - \frac{\beta}{2}\right) + \cos\left(\frac{\alpha}{2} - \frac{\beta}{2}\right)\tan\beta\right] < \frac{25.4}{3N_M}$$

where f is the focal length of the imaging optical system in a main scanning direction, Sk is the distance in the main scanning section from the rear side principal plane position of the imaging optical system to an imaging point at which the converged light beam is imaged by the imaging optical system, $\alpha$ is an angle in the main scanning section formed by the optical axis of the imaging optical system and the principal ray of the light beam incident on the light deflector, $\beta$ is an angle in the main scanning section formed by the optical axis of the imaging optical system and the principal ray of the light beam reflected at any angle by the light deflector, $\delta L$ is the unevenness amount of the distances, defined in the main scanning section, from the rotation center of the light deflector to the plurality of deflection surfaces, and $N_M$ is the number of pixels per one inch in the main scanning direction on the surface to be scanned determined from the resolution of an image in the main scanning direction.

2. An optical scanning apparatus according to claim 1, wherein the following conditional expression is satisfied $$0.24 < 1 - \frac{Sk}{f} \leq 1.0.$$

3. An image forming apparatus having an optical scanning apparatus according to claim 1, a photosensitive member disposed on said surface to be scanned, a developing device for developing an electrostatic latent image formed on the photosensitive member by a light beam scanned by the optical scanning apparatus as a toner image, a transferring device for transferring the developed toner image to a material to be transferred, and a fixing device for fixing the transferred toner image on the material to be transferred.

4. An image forming apparatus having an optical scanning apparatus according to claim 1, and a printer controller for converting code data inputted from an external device into an image signal and inputting the image signal to the optical scanning apparatus.

5. A color image forming apparatus having a plurality of image bearing members disposed on the surface to be scanned of an optical scanning apparatus according to claim 1 for forming images of different colors thereon.

6. A color image forming apparatus according to claim 5, having a printer controller for converting color signals inputted from an external device into image data of different colors and inputting the image data to the respective optical scanning apparatuses.

* * * * *